United States Patent [19]

Rasmussen

[11] Patent Number: 4,850,628
[45] Date of Patent: Jul. 25, 1989

[54] HAND-LEVERED HANDLE DEVICE

[76] Inventor: Lyle J. Rasmussen, 1601 E. Longdale, Sandy, Utah 84092

[21] Appl. No.: 161,757

[22] Filed: Feb. 29, 1988

[51] Int. Cl.$^4$ .................................................. B65G 7/12
[52] U.S. Cl. ....................................... 294/33; 294/27.1
[58] Field of Search ................. 294/33, 27.1, 29, 31.1; 16/114 R, 114 A; 215/100 A, 101; 220/94 R, 85 H

[56] References Cited

U.S. PATENT DOCUMENTS

| | | | |
|---|---|---|---|
| 1,350,641 | 8/1920 | Carlson | 294/33 |
| 1,437,171 | 11/1922 | Currey | 294/27.1 |
| 4,653,038 | 3/1987 | Boudreaux | 294/27.1 |

Primary Examiner—James B. Marbert
Attorney, Agent, or Firm—Thorpe, North & Western

[57] ABSTRACT

A handle device for direct, singular attachment to a top rim of a container for extending the reach of a human hand between the fingers and thumb to enable the user to grasp a portion of the container with the fingers while reaching upward along the side wall of the container toward the top rim, and using the thumb with the handle device for engaging the top rim. The device includes an intermediate, elongated stem having clip-on structure attached at one end and configured for developing a snug fit across the top rim of the container to resist a downward force applied toward the base portion of the container. A thumb grip member is attached at the other end of the stem and is configured to enable the user to interlock a thumb therein. The combination of clip-on structure, stem and thumb grip member are dimensioned to extend from the top rim to an intermediate section of the container whereby the only force applied to the device is a downward force developed by pulling the thumb and attached grip member toward the base of the container. Accordingly, the hand becomes an integral part of the handle which actually supports the weight of the container and enhances control on the part of the user.

9 Claims, 1 Drawing Sheet

HAND-LEVERED HANDLE DEVICE

BACKGROUND OF THE INVENTION

1. Field of Invention

The present invention relates to devices which may be attached to a container and which operate as a handle. More particularly, the present invention relates to a device which attaches at a top rim of the container and enables the container to be supported in any orientation.

2. Prior Art

Because the container industry is so competitive, common practice is to construct low cost containers which are disposable. Fabrication of such containers is typically more complex if a handle device is incorporated as part of the integral container structure. For example, many industries rely on metal containers for holding paints, food items, etc., and must compete at low profit margins for business. To attempt to compete by building a handle into the container would greatly increase production costs and reduce margins. Just as importantly, such handles increase the required storage space and thereby increase shipping costs and overhead. Consequently, a major segment of the container industry depends on symmetrical containers built on a low cost basis which do not include an form of handle.

In view of this market condition, attachable handles have been constructed which can be added to a container to facilitate ease of handling. By using an attachable handle, a container can be removed from a storage box and quickly affixed, without significant difficulty.

The typical methodology of applying an attachable handle to a container has consistently involved fixation of a handle device on the container to enable support of the container solely by the handle This approach is represented in the following patents:

| Patent Number | Patentee |
| --- | --- |
| 4,433,864 | F. D. Byrd |
| 4,200,323 | J. A. Cocksedge |
| 2,626,174 | R. S. Barber |
| 31,198 | J. Warner |
| 3,867,738 | D. L. Garner |
| 2,993,672 | A. F. Bower, et al |
| 2,029,429 | S. R. Koons |
| 1,437,171 | D. M. Currey |
| 2,075,685 | G. F. Wiedemann |

These references teach the use of a banding strap around the container, a clip across the rim of the container, and variations of these two structures. In each instance, however, the support for the container comes from the handle alone.

A major disadvantage of this approach is the need for a strong structural connection which will support the container and weight of contents. This support is generally applied at right angles to the container and requires sufficient rigid attachment to allow the container to be rotated in various orientations without the container releasing from the handle.

Accordingly, inadvertent release because of poor connection occurs frequently. Users may be reluctant to freely move the container to various orientations because of concern that the handle will break free and spill the contents. The user is also uncomfortable because the handle is substantially separated from the center of gravity of the container and creates a feeling of uncertainty as to whether the container will stay engaged by the handle.

In addition, the conventional type handle is typically tailored to a specific type of container. This is essential because the container must be totally supported in its weight by the attached handle. In other words, the full load of container and weight may be applied at an isolated point on the rim or at a strap location around the container body. If this point fails, then the handle fails and the contents of the container become history.

It is therefore an object of the present invention to provide a handle device which increases the sense of actual and perceived control of the container by placing the hand in closer proximity to the center of gravity.

It is a further object of the present invention to provide a handle which incorporates the user's hand as an actual component of the handle device.

A still further object of the present invention is to provide a handle device for use with containers larger than may be comfortably or easily handled with one hand.

These and other objects are realized in a handle device adapted for direct, singular attachment to a top rim of a container for extending the reach of the human hand between the fingers and thumb to enable the user to grasp a base portion of the container with the fingers while reaching upward along the side wall of the container toward the top rim with the thumb. The thumb engages a handle extension which comprises an intermediate, elongated stem, clip-on means attached at one end of the stem which is configured for a snug fit at the top rim, yet without sufficient rigid attachment that the container with contents could be supported by holding the handle device except with an applied downward force through the thumb, and the other end being positioned at the container side wall. This other end also includes a thumb grip member which is configured to enable a user to interlock his thumb therein. The combination of clip, stem and thumb grip are dimensioned to extend from the top rim of the container to an intermediate section thereof such that the only force applied to the device is a downward force developed by pulling the thumb and attached grip member toward the base of the container which is being gripped by fingers of the user. In this manner, the handle device and the hand of the user form the actual supporting handle for the container and greatly increase the amount of control and sense of security experienced by the user.

Other objects and features of the present invention will be apparent to those skilled in the art from the following detailed description, taken in combination with the accompanying drawings.

Figure 1:
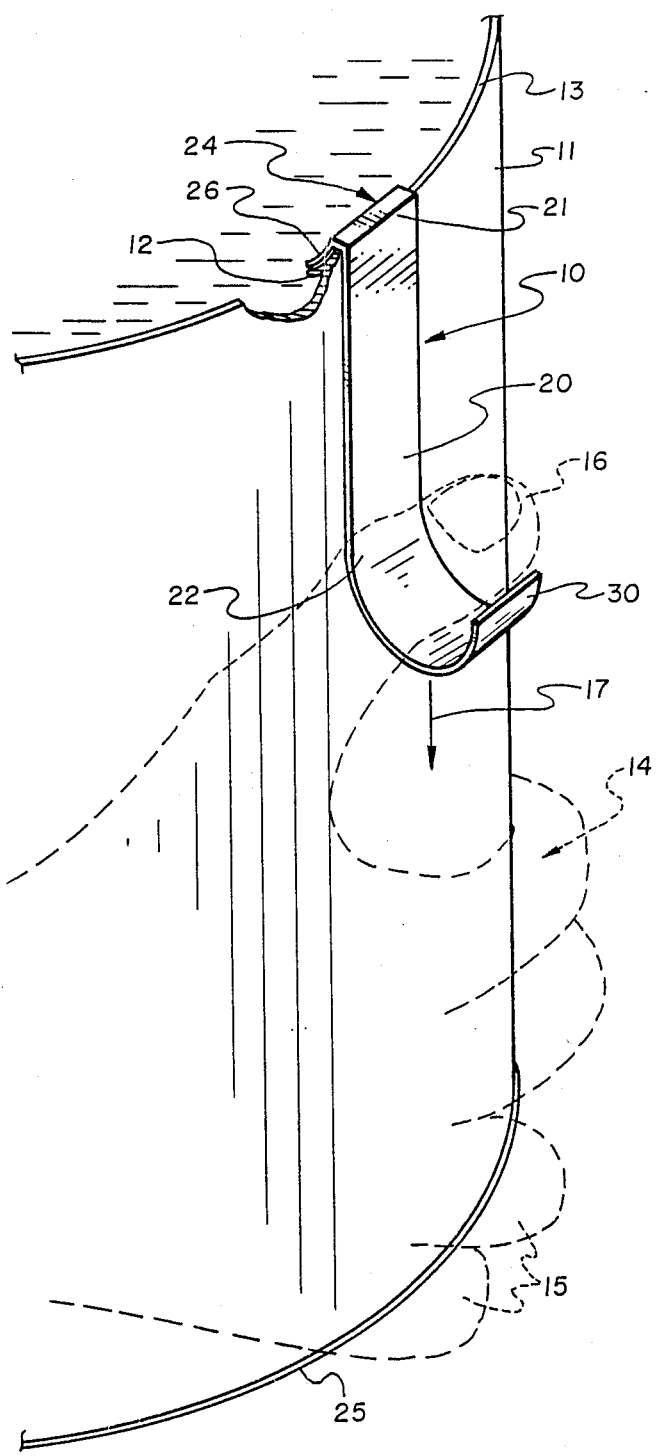
FIG. 1 shows a partial, perspective view of the present handle device attached at a top rim of a can, with a user's hand shown in phantom line gripping the device with the thumb and the container with several fingers of the hand.

DETAILED DESCRIPTION OF THE INVENTION Referring now to the drawings:

FIG. 1 shows a handle device 10 which is adapted for use with a container 11 having a drip lip 12 or other form of contoured inner surface at a top rim 13. The handle device 10 is adapted for singular attachment only, as opposed to attachment of the device at two separate locations, such as top and bottom.

Instead of operating as a conventional handle which is designed for providing total support to the container by having the handle attached with sufficient rigidity by means of straps or other mechanical devices such that the container and contents are fully supported by holding the handle in a conventional manner, gripping the handle device with the hand of the user. In contrast, the present invention adopts a different support methodology wherein the hand of the user 14 becomes part of the handle as illustrated in FIG. 1. Specifically, the present handle device 10 is designed to extend the reach of the human hand 14 between the fingers 15 and thumb 16 to enable a user to grasp a base portion of the container by wrapping fingers 15 thereunder while reaching upward along the side wall of the container 11 toward the top rim thereof. The handle device is engaged by the thumb 16 as shown in the figure to enable the user to apply a force downward 17 thereby engaging the hand and handle device as the handle support means for the container as a single, integral handle support means for the container and contents.

Accordingly, the handle device includes three components. These include an intermediate, elongated stem 20 which has a first end 21 and a second end 22. This intermediate stem may be configured as a flat strap as shown, or may be designed in other shapes suitable for the particular application. The disclosed flat embodiment permits the handle device to hug the container side more closely and move the center of gravity of the container and contents closer to the supporting hand 14. This broad, flat construction also assists in stabilizing the container against rocking movement by enabling the downward force 17 of the hand to apply a force against tilting movement as disclosed hereafter.

Clip-on means 24 are attached at the first end of the stem for engaging the top rim 13 of the container. Specifically, the clip-on means is adapted to satisfy three conditions. First, it is configured to give a snug fit across the top rim 13 of the container to enable the device to resist a downward force 17 which is applied toward the base 25 of the container. This clip-on means 24 may be adapted in a variety of shapes as is suggested by the four figures of this disclosure. Generally, the clip means will have a U-shaped structure, with one leg of the U being modified to fit a particular container design at its top rim. As used herein, U-shaped generally refers to an upper, curved portion of the handle device which has its terminal end returning back toward the second end of the stem, along either side thereof. For example, although the device 20 shown in FIG. 1 illustrates the clip-on means turning back on the opposite side from the thumb location, it could likewise be configured to turn back at the same side. In this instance, the device would simply be rotated 180 degrees, with the thumb being enclosed between the elongated stem 20 and the side wall of the container 11.

The function of the U-shape is to enhance a snug fit at the top rim of the container. Where the container is designed as shown in FIG. 1 with an anti-drip lip 12, one leg 26 of the U is configured to conform to the geometry of the contacting surface geometry of the anti-drip lip 12. Specifically, this leg of the U-shaped clip-on means resembles an outward projecting foot which diverges from the stem sufficient to grip and conform to the anti-drip lip, such as that used with paint or ink cans.

A second requirement of the clip-on means is that it be attached at the first end of the stem and configured in such a manner that it does not provide a sufficiently rigid attachment that the container with contents could be supported by holding the handle device except with the applied downward force 17 as illustrated. This feature distinguishes this device from prior art handles which are attached laterally of the container and which provide full support to the container and contents, with the user merely grasping the handle in a conventional manner. The application of this downward force 17 is enabled by use of a thumb grip member 30 which is attached at the second end 22 of the stem. The illustrated thumb grip member 30 is arcuate in shape and provides a "J" configuration to the subject handle device. The downward force is developed by interlocking the thumb 16 in the concave section of the thumb grip member 30, and then by squeezing the hand toward a closed configuration of the fingers and thumb, while resisting with fingers 15 wrapped around the base 25 of the container.

In order to enable the downward force 17 to be applied, the second end 22 of the handle and attached thumb grip member 30 are dimensioned to extend from the top rim of the container 13 to an intermediate section of the side wall at a sufficient distance from the base 25 so that the user has the capacity to pull restraining fingers 15 and engaged thumb 16 toward each other with the required downward force 17. This may be facilitated by wrapping all four fingers around the base, or a lesser combination as illustrated in FIG. 1.

The subject handle device 10 may be fabricated of injection-molded plastics, metal strips or other metal pieces molded or formed to the desired configuration, or other materials which provide the necessary strength and rigidity to resist the downward force 17 applied during use. For example, the specific device illustrated in FIG. 1 is formed from a metal strap which is bent around a mandrel to form the thumb grip 30, the first end 21 being formed in a general U-shaped configuration which is molded at a second mandrel or forming means to conform to the top rim 13 and anti-drip lip 12 of the supported container. The specific embodiment represents a general description of a handle device comprised of a single structural member which is configured in a J-shape wherein the clip-on means formed by a bent top end of the J shape wraps over the lip of the container, the curved base of the J comprising the thumb grip member. For example, this same structure is applied in FIGS. 3 and 4 in different embodiments.

Figure 2:
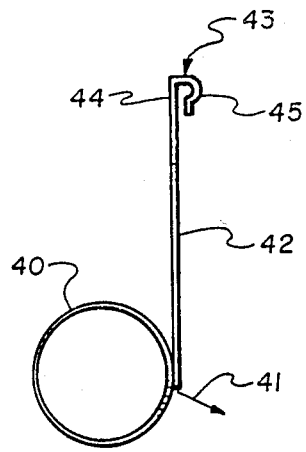
FIG. 2 shows a side view of an alternate embodiment of the present invention which utilizes a circular thumb grip member.

The embodiment of FIG. 2 is modified to include a circular thumb grip member 40 which increases the ability of the thumb grip member to resist downward force 17. This greater resistance occurs because the force 41 arising from application of force 17 in a downward direction tends to push the curved thumb grip member inward along the direction of force 41. This movement is resisted at the thumb grip member and stem 42 by the attached container side wall. The embodiment of FIG. 2 shows an alternate configuration for the clip-on means 43. Here again, the clip-on means again comprises an inverted, substantially U-shaped element wherein one leg of the U comprises an upper portion 44 of the intermediate stem 42, the second leg of the U 45 being configured to fit over a top rim of the attached container.

Figure 3:
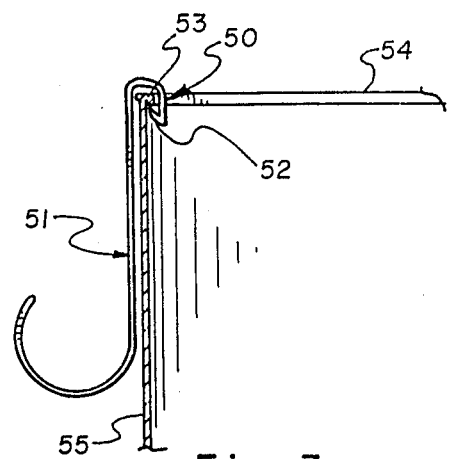
FIG. 3 shows a cutaway view of a can or container having a rolled internal edge and a third embodiment of the present gripping device inserted thereat.

FIG. 3 illustrates an embodiment wherein the second leg 50 of the handle device 51 includes an inward projecting foot 52 which is configured to catch at a top, rolled edge 53 of the top rim 54 of a container 55. This enhances the gripping action of the clip-on means 50 and prevents the handle from inadvertently falling free from its attached position.

Figure 4:
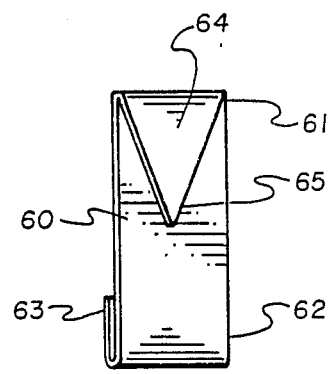
FIG. 4 shows another alternate embodiment of the present invention adapted with a pointed clip-on member for inserting through a top lid cover of the container.

FIG. 4 illustrates a structure which is adapted for insertion through a portion of a top lid on a container such as a pop can or other type of food container. This embodiment includes an intermediate stem 60 having a first end 61 and second end 62. A curved thumb grip member 63 is formed at the second end 62 to provide a J-shape as previously described. The first end includes an attached clip-on means 64 which is configured with a pointed end 65. The pointed end of the clip-on means can be used to pierce a thin, top lid to anchor the device in a seated configuration at the container top rim.

All these devices are adapted for use in accordance with a method for grasping and supporting a container in a manner represented by the following steps. First, the user attaches to a top rim of the container one end of an elongated handle device such as illustrated in the figures. The user then positions the thumb grip member of such a device at an intermediate wall section of the container between the top rim and container base. The thumb is then interlocked with the thumb grip member, and several fingers of the user's hand are wrapped around the base of the container. The user then applies a downward force at the thumb member and along the handle device to thereby incorporate the hand as an integral part of a supporting handle for the container. In this manner, the user is given greater control of the container and feels increased confidence because of the enhanced support and close center of gravity between the hand and container with contents.

The versatility of this device is a major advantage over prior art handles. For example, the present device can be quickly adapted for use with all types and sizes of cans, and particularly those within the food industry. It may be used with drinking cups, containers for kitchen uses and other applications which favor maintaining one hand free from involvement with the container. It is apparent from the foregoing disclosure that an advantage of the present invention is its enabling a user to grasp a container with one hand which container might otherwise be too large for the user to secure in a firm grip by wrapping his fingers and thumb around the container circumference. Instead, the user can now apply the present handle device to firmly secure the oversized can with a single hand, leaving the other hand free for other uses. With respect to the FIG. 4 embodiment, it should be noted that a particularly valuable use may involve application of the pointed clip-on means through a plastic lid on a drink container. Many drink containers now are of substantial size such that two hands are required for secure handling. The present device (FIG. 4) allows a user to grasp the large drink container in a single hand without removing the plastic lid.

A particularly valuable application of the present invention arises in the printing trade. Because of the large size of a five-pound can of ink, two hands are usually required to pour the ink into a feed pan or other receptacle. The ability to grasp the ink can with a single hand is important because many ink compositions are caustic or will stain skin and are not to be touched. The use of the present device enables the user to hold a ink knife in his free hand to better control ink flow from the can to the receptacle. These same principles can be applied toward application of this device with paint cans.

It will be apparent to those skilled in the art that other configurations and applications for the subject invention may be developed. Accordingly, it is to be understood that the scope of this invention is not to be limited by the examples provided herein, but is defined by the following claims.

I claim:

1. A handle device for direct, singular attachment to a top rim of a container for extending the reach of a human hand between the fingers and thumb to enable a user to grasp a base portion of the container with the fingers while reaching upward along a side wall of the container toward the top rim and using the thumb with the handle device for extending thumb reach, said device comprising:

an intermediate, elongated stem having a first end and a second end;

clip-on means attached at the first end of the stem and configured for (i) a snug fit across the top rim of the container to resist a downward force applied toward the base portion of the container, (ii) but without a sufficiently rigid attachment that the container with contents could be supported by holding the handle device except with the applied downward force and (iii) positioning the second end of the handle device at the container side wall; and a thumb grip member attached at the second end of the stem and configured to enable a user to interlock a thumb therein;

the combination of clip-on means, stem and thumb grip member being dimensioned to extend from the top rim of the container to an intermediate section thereof wherein the only force applied to the device is a downward force developed by pulling the thumb and attached grip member toward the base of the container while gripping the base portion thereof, thereby incorporating the gripping hand as an integral part of the handle which actually supports the weight of the container.

2. A device as defined in claim 1, wherein the handle device comprises a single structural member which is configured in a J-shape with the clip-on means formed by a bent top end of the J which wraps over the lip of the container, the curved base of the J comprising the thumb grip member.

3. A device as defined in claim 2, wherein the single structural member is formed from a strap of metal capable of retaining the J shape during downward force from a user's hand.

4. A device as defined in claim 1, wherein the clip-on means includes a pointed terminal section which wraps back toward the thumb grip member along an upper portion of the intermediate stem and which can be pressed through a top lid of the container for positioning across the top rim.

5. A device as defined in claim 1, wherein the clip-on means comprises an inverted, substantially U-shaped element wherein one leg of the U comprises an upper portion of the first end of the intermediate stem, the second leg of the U being configured to fit over the top rim of the container.

6. A device as defined in claim 5, wherein the second leg of the U-shaped element includes an inward projecting foot which is configured to catch at a top, rolled edge of the top rim to thereby prevent the handle device from inadvertently falling free from its attached position.

7. A device as defined in claim 5, wherein the second leg of the U-shaped element includes an outward projecting foot which diverges from the stem of the device sufficient to conform to a portion of an anti-drip lip of a paint can.

8. A device as defined in claim 1, wherein the thumb grip member comprises a circular structure which has a sufficiently large diameter to enable a user's thumb to be inserted therein.

9. A method for grasping and supporting a container, comprising the following steps in nonselective order:
   attaching to a top rim of the container one end of an elongated handle device;
   positioning a thumb grip member attached at a second end of the handle device near an intermediate wall section of the container between the top rim and container base;
   interlocking a thumb of a user's hand with the thumb grip member;
   wrapping fingers of the user's hand around the base of the container; and
   applying a downward force on the elongated handle device to thereby incorporate the hand as an integral part of a supporting handle for the container.

* * * * *